(12) United States Patent
Ober

(10) Patent No.: US 10,387,079 B2
(45) Date of Patent: Aug. 20, 2019

(54) PLACEMENT OF DISPERSED STORAGE DATA BASED ON REQUESTOR PROPERTIES

(71) Applicant: International Business Machines Corporation, Armonk, NY (US)

(72) Inventor: Brian F. Ober, Lake in the Hills, IL (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 15/260,898

(22) Filed: Sep. 9, 2016

(65) Prior Publication Data
US 2018/0074753 A1    Mar. 15, 2018

(51) Int. Cl.
*G06F 3/06*        (2006.01)
*G06F 11/10*       (2006.01)

(52) U.S. Cl.
CPC .......... *G06F 3/067* (2013.01); *G06F 3/0605* (2013.01); *G06F 3/0631* (2013.01); *G06F 3/0635* (2013.01); *G06F 11/1076* (2013.01)

(58) Field of Classification Search
CPC .......... G06F 11/1076; G06F 11/1008; G06F 11/106; G06F 3/0659; G06F 3/065; G06F 3/067; G06F 3/0619; G06F 3/064; H05K 999/99; G11C 2029/0411
USPC ........................................................ 714/764
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Albert Decady
*Assistant Examiner* — Enam Ahmed
(74) *Attorney, Agent, or Firm* — Garlick & Markison; Timothy W. Markison; Harry S. Tyson, Jr.

(57) ABSTRACT

Methods for use in identifying optimal storage units for storage of data in a dispersed storage network (DSN) having geographically distributed storage units. In operation, a data object to be stored is received by a computing device functioning. When selecting from multiple sets of storage units servicing multiple geographic regions for placement of the data, the computing device biases its decision based on additional properties of the storage request or of the requestor. In one example, the primary or "home" location of the requestor is determined from metadata received from an authentication authority. Alternatively, the home location information may be derived from a store data request received from the requestor. Following a determination that the originating location of the storage request differs from the home location, the computing device selects storage units in relatively closer proximity to the home location as compared to a current location of the requestor.

20 Claims, 8 Drawing Sheets

(56) References Cited

U.S. PATENT DOCUMENTS

| | | | |
|---|---|---|---|
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,074,218 | B2 * | 12/2011 | Eilam .................. G06F 9/5077 714/746 |
| 9,772,791 | B2 * | 9/2017 | Resch .................. G06F 3/0643 |
| 10,216,443 | B2 * | 2/2019 | Hegde .................. G06F 3/0635 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0055178 | A1 * | 3/2011 | Mark .................. G06F 3/0619 707/697 |
| 2012/0311403 | A1 * | 12/2012 | Gladwin .............. H04L 65/602 714/763 |
| 2013/0283095 | A1 * | 10/2013 | Dhuse .................. G06F 11/1076 714/6.22 |
| 2014/0351528 | A1 * | 11/2014 | Motwani .................. H04L 9/085 711/156 |
| 2014/0351579 | A1 * | 11/2014 | Leggette .................. H04L 63/06 713/156 |
| 2015/0293896 | A1 * | 10/2015 | Runkis .................. G06F 9/45533 707/755 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

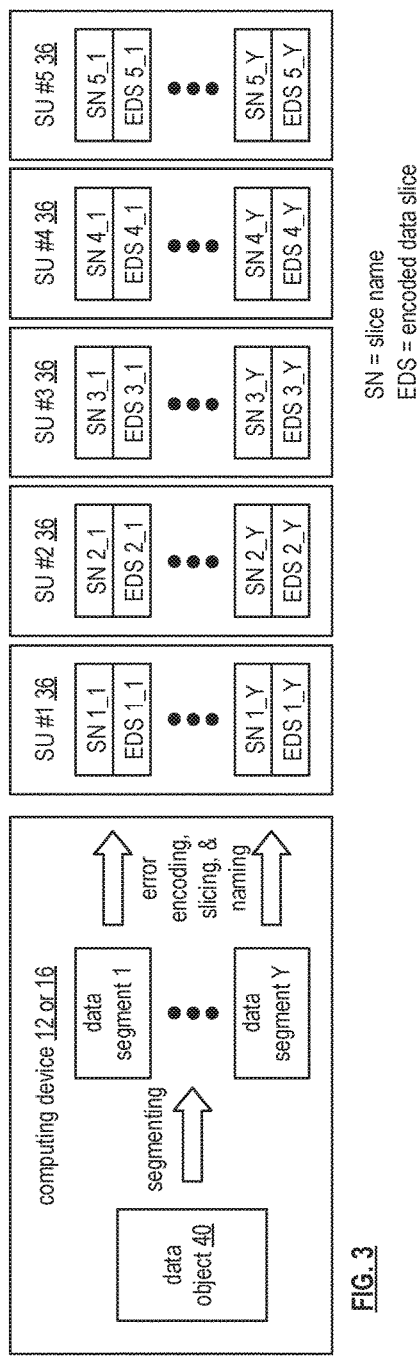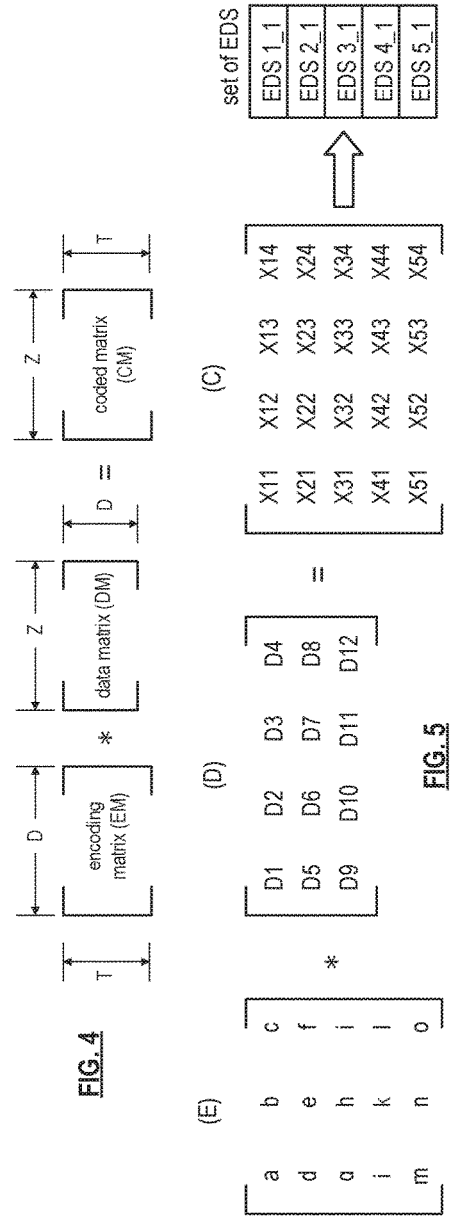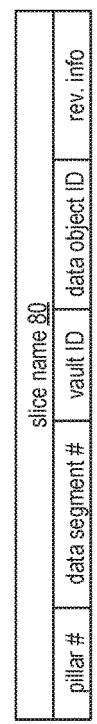

PLACEMENT OF DISPERSED STORAGE DATA BASED ON REQUESTOR PROPERTIES

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to selection of a storage location for data in a dispersed storage network based on properties of a requestor.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION OF THE INVENTION

Figure 1:
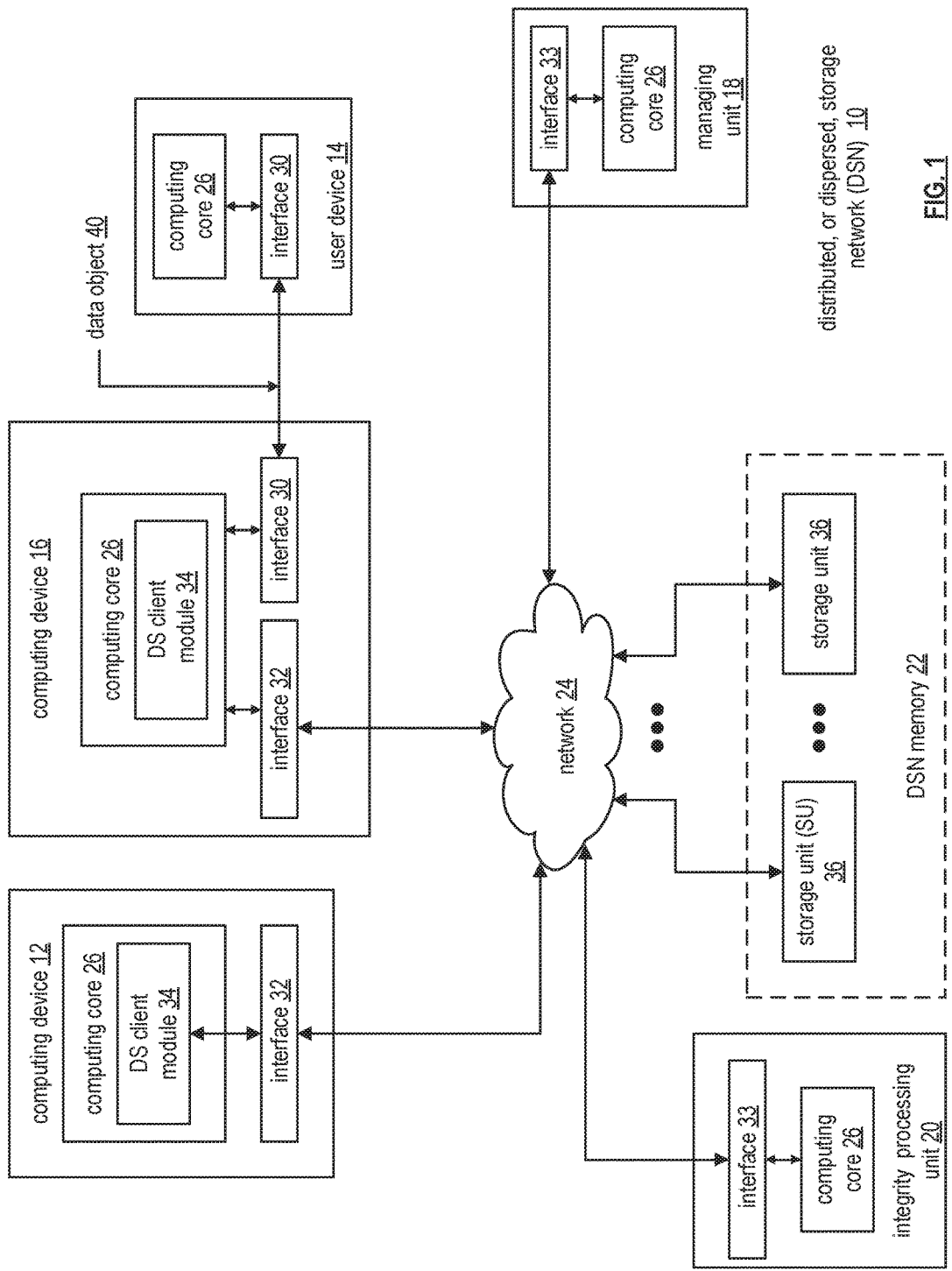
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
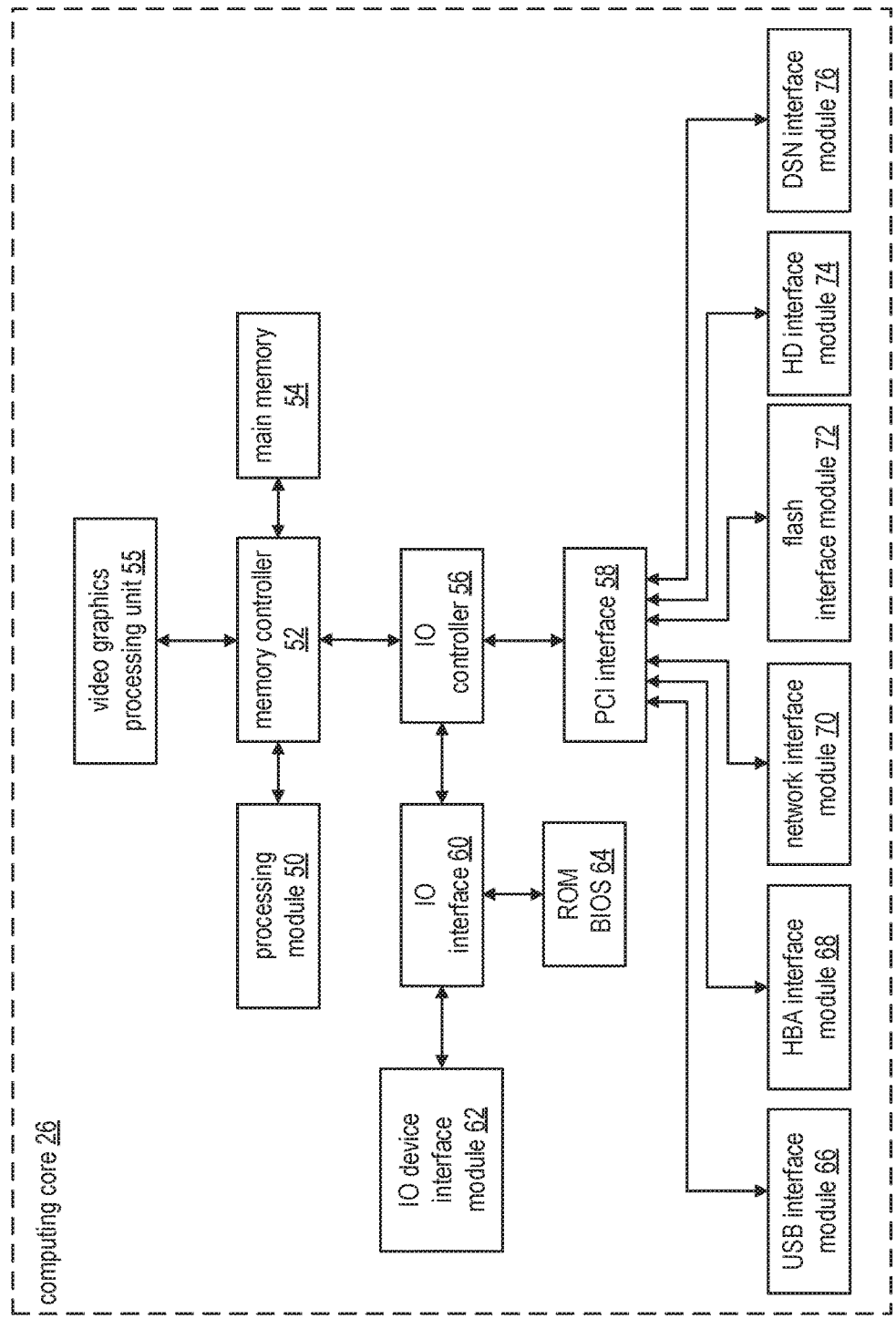
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks such as those described below, etc.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between user device 14 and computing device 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for user device 14. In this role, computing device 16 dispersed storage error encodes and decodes data on behalf of user device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, dispersed storage parameters, security parameters, billing information, user profile information, etc.) for computing device 12 and user device 14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The managing unit 18 creates and stores user profile information (e.g., an access control list (ACL)) in local memory and/or within memory of the DSN memory 22. The user profile information includes authentication information/credential s, permissions, and/or the security parameters. The security parameters may include encryption/decryption scheme, one or more encryption keys, key generation scheme, and/or data encoding/decoding scheme. As discussed more fully below in conjunction with FIGS. 9-12, the user profile information may include primary (or "home") location information regarding a user. This primary location information may be utilized to identify a primary geographical region for a user/user device for purposes of optimal storage unit selection when processing data access requests (e.g., store data requests).

The managing unit 18 further creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36. Examples of task queuing, initiation and execution by DSN memory 22 is discussed in greater detail with reference to FIGS. 9-13.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
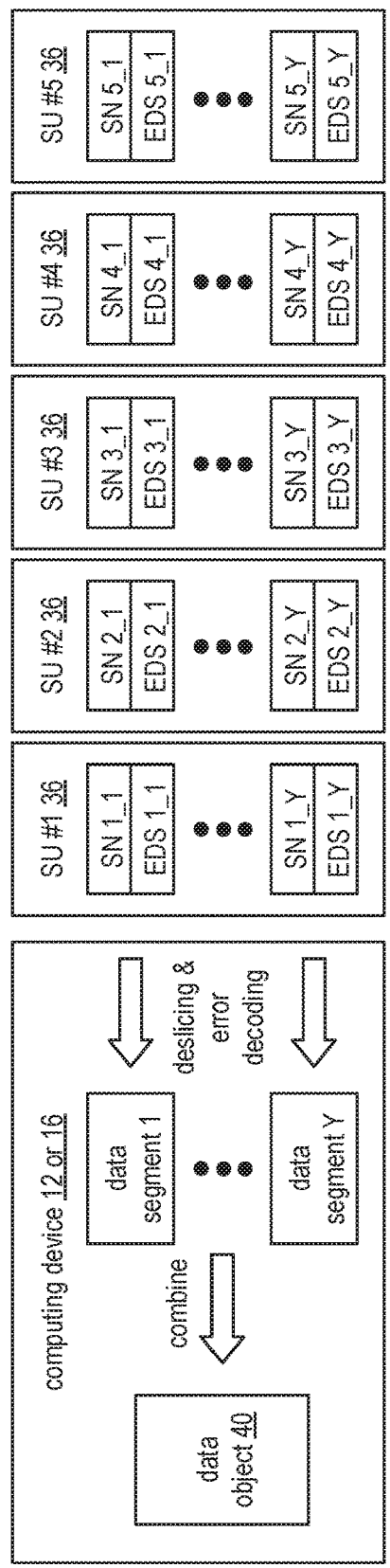
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
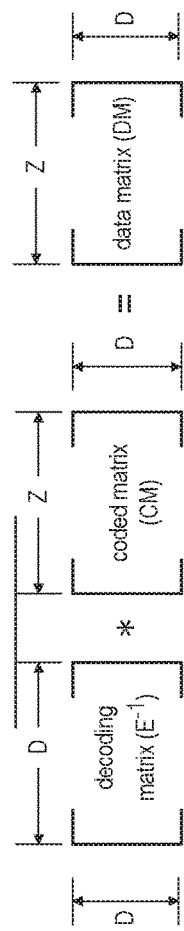
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In certain circumstances such as described more fully below, when a requestor desires to store data in DSN memory that is geographically distributed, optimal placement of DS error encoded data within the DSN memory may depend on the location(s) from which the data is most likely to be accessed in the future, as opposed to a current location of the requestor. Novel methodologies are described herein for identifying optimal storage units for storing such data. In operation, when data to be stored is received by a computing device functioning as a dispersed storage processing agent within the DSN, and the computing device has the option of selecting from multiple storage locations for placement of the data, the computing device may bias its decision based on additional properties of the request or of the requestor.

For example, if the primary or "home" location of the requestor is known, and the requestor is known to be roaming, the computing device may select storage units in relatively closer proximity to the primary location as opposed to storage units service a current location of the requestor or the location of the computing device. As described more fully below in conjunction with FIGS. 9-12, such methodologies may involve use of metadata, received from an authentication authority, regarding the primary location or geographic region of the requester. In other examples, location information may be derived from a store data request received from the requestor.

Figure 9:
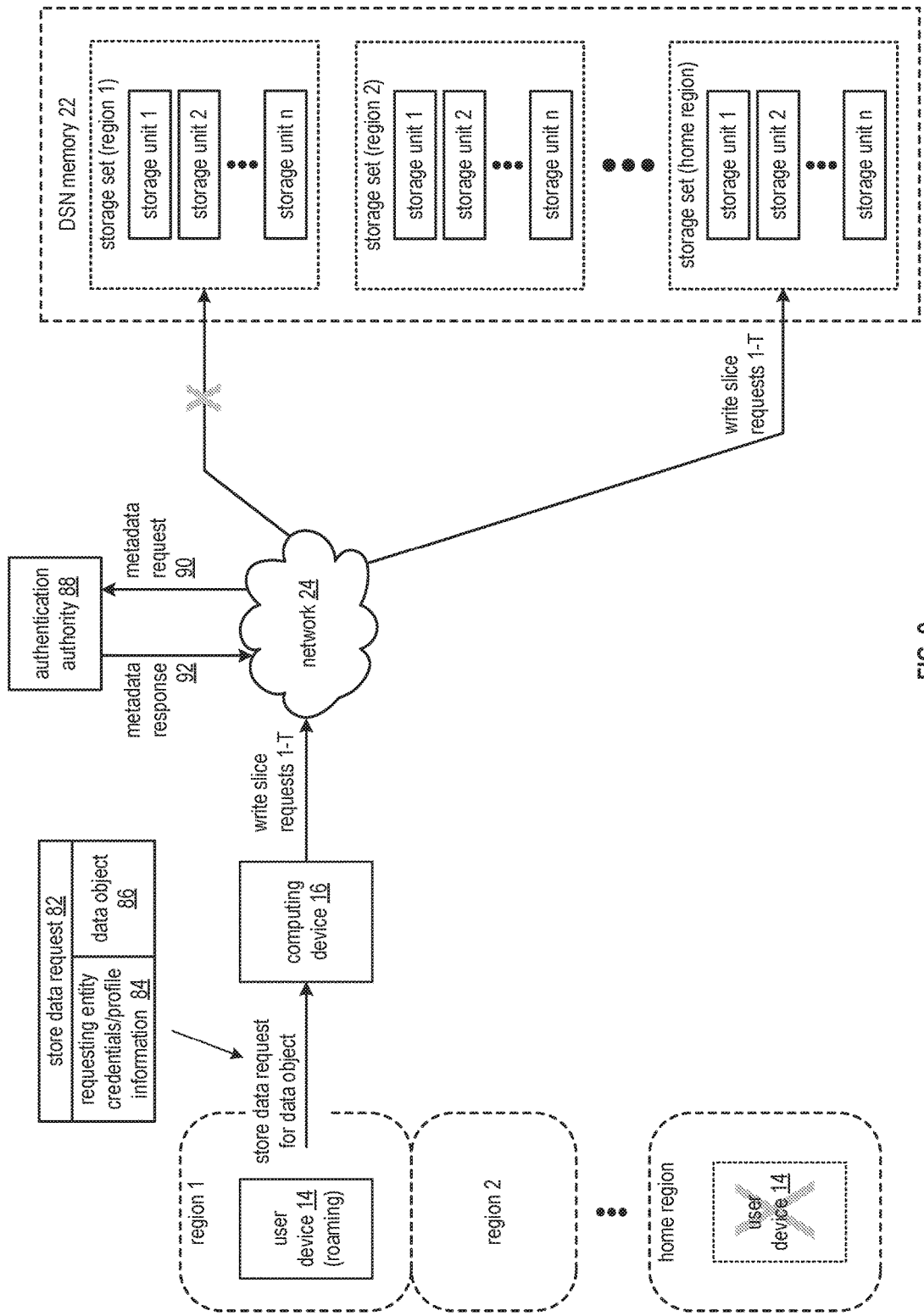
FIG. 9 is a schematic block diagram of an example of a DSN storing data in accordance with the present disclosure.

Referring more particularly to FIG. 9, a schematic block diagram of an exemplary dispersed storage network (DSN) storing data in accordance with the present disclosure is shown. In the illustrated embodiment, the DSN memory 22 includes a plurality of storage sets servicing a plurality of geographic regions, the network 24 of FIG. 1, user device 14 and computing device 16 FIG. 1. Each of the storage sets include a set of storage units 1-n, where a storage unit may be associated with more than one storage set. For example, the storage set associated with region 1 may include storage units 1-5 (e.g., a pillar width of five and a decode threshold of three) and the storage set associated with region 2 may include differing storage units 1-7 (e.g., a pillar width of seven and a decode threshold of four). Each storage unit may be implemented utilizing the storage unit 36 of FIG. 1. Hereafter, each storage set may be interchangeably referred to as a set of storage units.

In the illustrated embodiment, a "primary" or "home" geographic region or location is associated with the user device 14 (e.g., included in a user profile accessible to or maintained by the DSN). The user device 14 may roam to other geographic regions, such as region 1 or region 2, and perform data access operations in these regions. Each of these regions is associated with a respective set of storage units for processing of data storage requests by devices located within the given region. While roaming in region 1, user device may transmit a store data request 82 to computing device 16. The store data request 82 includes a requesting entity credentials (and/or profile information) field 84 and a data object field including at least a portion of a data object 86 to be stored in the DSN. The requesting entity credentials field may contain, for example, one or more of a requesting entity identifier (ID), a requesting entity name, a password, a signed certificate, or a user profile identifier. The requesting entity may be interchangeably referred to herein as a "requestor" or "requester".

Having received the store data request 82, the computing device 16 selects an authentication authority 88 based on one or more of the requesting entity credentials 84 or the request type of the store data request 82. In addition to authenticating the requesting entity credentials, the authentication authority 88 (e.g., an Active Directory® service, a Lightweight Directory Access Protocol (LDAP) server, or a KeyStone identity service) may provide information to assist the computing device 16 indicating a primary geographic region associated with the user device 14 or relevant user profile. In other examples (such as described in conjunction with FIGS. 11-12) in which a requestor is anonymously authenticated or when a primary geographic for the requestor is unknown, the requestor can include a parameter in the store data request that includes information regarding the requestor's home location, in the form of location coordinates, continent/country identification information, address information, a ZIP code, or other location indicia.

Having identified the authentication authority 88, the computing device 16 issues a metadata request 90 to the selected authentication authority 88, where the metadata request 90 includes information from the requesting entity credentials field 84. The authentication authority 88 receives the metadata request 90 and determines whether the requesting entity credentials are valid (e.g., valid when a password matches a requesting entity ID, valid when a signed certificate includes a valid signature by a valid authorizing signing entity, etc.). The authentication authority 88 issues a metadata response 92 to the computing device 16 indicating whether the requesting entity has been authenticated or not authenticated. The authentication authority 88 indicates that the requesting entity has been authenticated when the requesting entity credentials 84 are valid.

When the requesting entity is authenticated, the metadata response 92 further includes information indicating a primary geographic region (e.g., per a user profile) for the user device 14. Upon receiving the metadata response 92 from the selected authentication authority 88, the computing device 16 is able to identify the primary geographic region.

The computing device 16 is further operable to analyze the store data request 82 to determine an originating geographic region for the request. When the originating geographic region differs from the primary geographic region (e.g., the user device 14 is roaming), the computing device 16 identifies a plurality of storage units associated with data storage in the primary geographic region, and facilitates storage of data object in the identified plurality of storage units as opposed to the storage set affiliated with region 1.

Facilitating storage of the data object may include, for example, processing the data object 86 of the store data request 82 for dispersed storage in the DSN. In an example, the computing device 16 dispersed storage error encodes the data object 86, in accordance with dispersal parameters associated with the user profile, to produce a plurality of sets of encoded data slices, wherein the data object is segmented into a plurality of data segments and wherein each data segment is dispersed storage error encoded into a respective set of encoded data slices. The computing device 16 sends a corresponding threshold number of encoded data slices of the set of encoded data slices to the identified storage units of the storage set servicing the primary/home geographic region. For example, the computing device 16 generates a threshold number of write slice requests 1-T, and sends, via the network 24, the generated threshold number of write slice requests to a selected threshold number of identified storage units.

Generally, the storage units of a given storage set are proximate one another (e.g., implemented at a common site of the DSN). In certain examples, however, a geographic region may be serviced by a storage set that is not entirely physically located within the serviced area (e.g., to leverage relatively higher performing/capacity storage units, or address maintenance issues).

Figure 11:
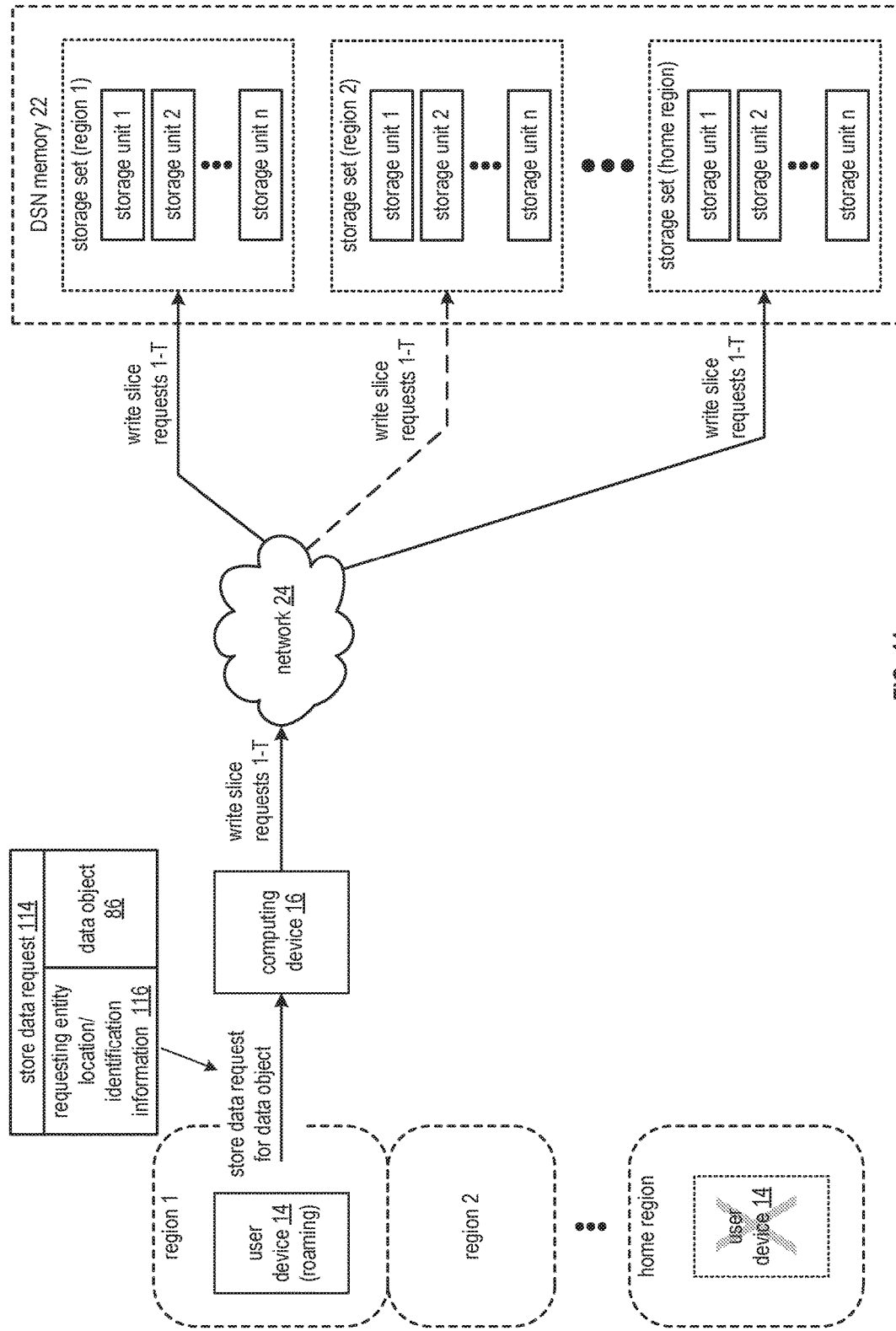
FIG. 11 is a schematic block diagram of another example of a DSN storing data in accordance with the present disclosure.

Further, as described in conjunction with FIG. 11, the computing device 14 may further facilitate storage of a replicated copy of at least a portion of the plurality of sets of dispersed storage error encoded data slices. For example, encoded data slices may be replicated in the storage set servicing region 1, regions 1 and 3, region 2, regions 1 and 2, regions 2 and 3, or regions 1, 2 and 3. This pattern could be expanded for any number of regions and/or sub-regions greater than 3, with a greater number of possible combinations for each additional number of regions and/or sub-regions.

In a further example, geolocation information relating to the user device 14 may be utilized to determine movement from one region to another. In this instance, replicated encoded data slices may be deleted from storage sets of one or more least proximate region(s), maintained in the two most proximate storage sets, etc. Deletion of replicated encoded data slices may be delayed for a pre-determined period of time during which the current region of the user device 14 does not change.

Figure 10:
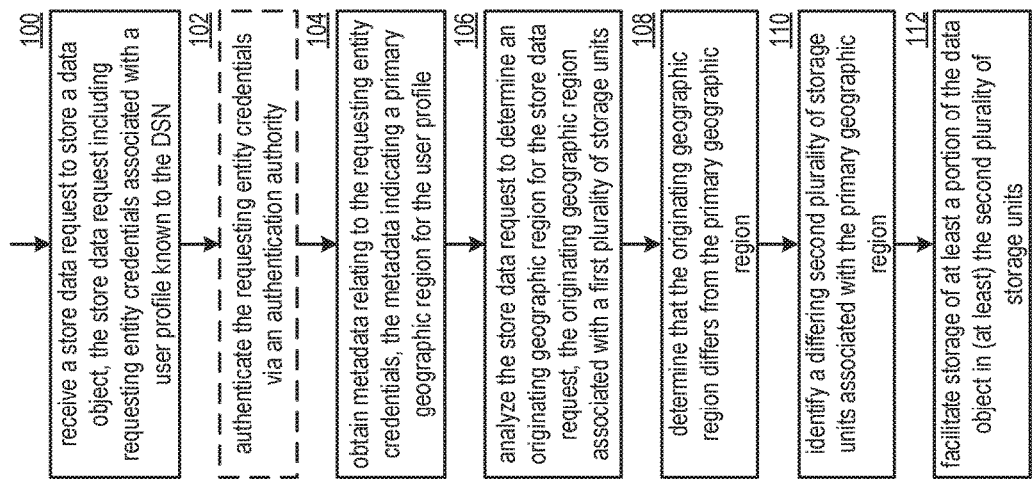
FIG. 10 is a logic diagram illustrating an example of data storage in a DSN in accordance with the present disclosure.

FIG. 10 is a logic diagram illustrating an example of data storage in a DSN in accordance with the present disclosure. The method begins or continues at a step 100 where a processing module (e.g., of a computing device 16 or managing unit 18) receives a store data request to store a data object in a set of storage units, the store data request including requesting entity credentials associated with a user profile known to the DSN. The method continues at optional step 102 where the requesting entity credentials are authenticated via an authentication authority.

Next, at step 104, the processing module obtains metadata relating to the requesting entity credentials, wherein the metadata indicates a primary geographic region for user profile. The method continues at step 106 where the processing module analyzes the store data request to determine an originating geographic region for the store data request, the originating geographic region associated with a first plurality of storage units. The analysis may include one or more of interpreting embedded source information or other data in the store data request or a communication session associated with the store data request, determining a location of a user device from which the store data request originated, determining the location of a user of the user device from which the store data request originated, determining a location of a computing device receiving the store data request, etc.

In step 108, the method continues and the processing module determines that the originating geographic region differs from the primary geographic region associated with the user profile. Next, at step 110, the processing module identifies a second, differing plurality of storage units associated with the primary geographic region. At step 112, the processing module then facilitates storage of at least a portion of the data object (e.g., using a dispersed error encoding process such as described above and/or including a decode threshold number of encoded data slices) in the second plurality of storage units affiliated with the primary geographic region identified at step 104.

The method described above in conjunction with the computing device 16 can alternatively be performed by other modules (e.g., DS client modules 34) of a dispersed storage network or by other devices. In addition, at least one memory section that stores operational instructions can, when executed by one or more processing modules of one or more computing devices of a dispersed storage network (DSN), cause the one or more computing devices to perform any or all of the method steps described above.

FIG. 11 is a schematic block diagram of another example of a DSN storing data in accordance with the present disclosure. While the DSN of this example operates in a similar manner to the example of FIG. 9, the illustrated embodiment may be employed in situations wherein a requestor is anonymously authenticated, or when a primary geographic for the requestor is unknown. In this situation, the roaming user device 14 issues a store data request 114 that includes requesting entity location and/or identification information 116 in addition to the data object 86. The requesting entity location and/or identification information 116 may include, for example, information regarding the requestor's home location/region in the form of location coordinates, continent/country identification information, address information, a ZIP code, or other location indicia. An authentication authority (not separately illustrated) may be employed to authenticate the requestor.

The computing device 16 of this example is operable to analyze the requesting entity location and/or identification information 116 of the store data request 114 to determine an originating geographic region for the request. When the originating geographic region differs from the primary geographic region (e.g., the user device 14 is roaming), the computing device 16 identifies a plurality of storage units associated with data storage in the primary geographic region, and facilitates storage of data object in the identified plurality of storage units.

Facilitating storage of the data object may include, for example, processing the data object 86 of the store data request 114 for dispersed storage in the DSN. In an example, the computing device 16 dispersed storage error encodes the data object 86, in accordance with dispersal parameters associated with the computing device 14, to produce a plurality of sets of encoded data slices, wherein the data object is segmented into a plurality of data segments and wherein each data segment is dispersed storage error encoded into a respective set of encoded data slices. The computing device 16 sends a corresponding threshold number of encoded data slices of the set of encoded data slices to the identified storage units of the storage set servicing the primary/home geographic region. For example, the computing device 16 generates a threshold number of write slice requests 1-T, and sends, via the network 24, the generated threshold number of write slice requests to a selected threshold number of identified storage units.

As illustrated, the computing device 14 may further facilitate storage of a replicated copy of at least a portion of the plurality of sets of dispersed storage error encoded data slices. For example, encoded data slices may be replicated in the storage set servicing region 1, regions 1 and 3, region 2, regions 1 and 2, regions 2 and 3, or regions 1, 2 and 3. This pattern could be expanded for any number of regions and/or sub-regions greater than 3, with a greater number of possible combinations for each additional number of regions and/or sub-regions.

Figure 12:
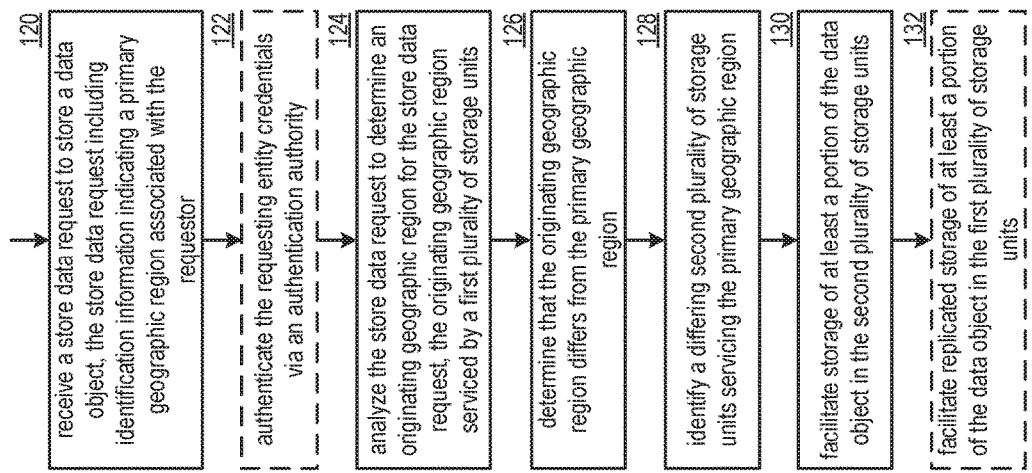
FIG. 12 is a logic diagram illustrating another example of data storage in a DSN in accordance with the present disclosure.

FIG. 12 is a logic diagram illustrating another example of data storage in a DSN in accordance with the present disclosure. The method begins or continues at a step 120 where a processing module (e.g., of a computing device 16 or managing unit 18) receives a store data request to store a data object in a set of storage units, the store data request including identification information indicating a primary geographic region associated with the requestor. The method continues at optional step 122 where the requesting entity is authenticated via an authentication authority.

The method continues at step 124 where the processing module analyzes the store data request to determine an originating geographic region for the store data request, the originating geographic region serviced by a first plurality of storage units. The analysis may include one or more of interpreting embedded source information or other data in the store data request or a communication session associated with the store data request, determining a location of a user device from which the store data request originated, determining the location of a user of the user device from which the store data request originated, determining a location of a computing device receiving the store data request, etc.

In subsequent step 126, the method continues and the processing module determines that the originating geographic region differs from the primary geographic region. Next, at step 128, the processing module identifies a second, differing plurality of storage units associated with the primary geographic region. At step 130, the processing module then facilitates storage of at least a portion of the data object (e.g., using a dispersed error encoding process such as described above) in the second plurality of storage units affiliated with the primary geographic region identified at step 120. When replicated storage of all or a part of the data object 86 is desired, the method proceeds to step 132 where the processing module facilitates storage of at least a portion of the data object in the first (and/or other) plurality of storage units.

The methods described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN) having storage units distributed in a plurality of geographic regions, the method comprises:

receiving a store data request to store a data object in the storage units of the DSN, wherein the store data request includes requesting entity credentials associated with a user profile of the DSN;

obtaining metadata relating to the requesting entity credentials, the metadata indicating a primary geographic region for the user profile;

analyzing the store data request to determine an originating geographic region for the store data request, the originating geographic region associated with a first plurality of storage units;

determining that the originating geographic region differs from the primary geographic region;

in response to determining that the originating geographic region differs from the primary geographic region, identifying, by the one or more processing modules, a second plurality of storage units associated with the primary geographic region, the second plurality of storage units differing from the first plurality of storage units; and facilitating, by the one or more processing modules, dispersed storage of at least a portion of the data object in the second plurality of storage units.

2. The method of claim 1 further comprises:
selecting an authentication authority based on the requesting entity credentials;
providing at least a portion of the requesting entity credentials to the authentication authority; and
receiving responsive information from the authentication authority indicating that the requesting entity credentials are authenticated.

3. The method of claim 2, wherein the authentication authority includes at least one of Active Directory® Domain Services, a Lightweight Directory Access Protocol server, or a KeyStone identity service.

4. The method of claim 1, wherein the first plurality of storage units is in closer geographic proximity to the originating geographic region than the primary geographic region.

5. The method of claim 1, wherein facilitating dispersed storage of at least a portion of the data object in the second plurality of storage units includes:
dispersed storage error encoding the data object, in accordance with dispersal parameters associated with the user profile, to produce a plurality of sets of encoded data slices, wherein the data object is segmented into a plurality of data segments and wherein each data segment is dispersed storage error encoded into a respective set of encoded data slices;
identifying one or more storage units of the second plurality of storage units; and
initiating storage of the plurality of sets of encoded data slices in the one or more identified storage units.

6. The method of claim 1 further comprises:
facilitating, by the one or more processing modules, replicated storage of at least a portion of the data object in the first plurality of storage units.

7. The method of claim 1 further comprises:
identifying a third plurality of storage units associated with a third geographic region, the third plurality of storage units in closer proximity to the primary geographic region than the first plurality of storage units; and
facilitating, by the one or more processing modules, replicated storage of at least a portion of the data object in the third plurality of storage units.

8. The method of claim 1, wherein analyzing the store data request to determine an originating geographic region includes at least one of determining a location of a user device from which the store data request originated, determining the location of a user of the user device from which the store data request originated, or determining a location of a computing device receiving the store data request.

9. A method for execution by one or more processing modules of one or more computing devices of a dispersed storage network (DSN) having storage units distributed in a plurality of geographic regions, the method comprises:
receiving a store data request to store a data object in the storage units of the DSN, wherein the store data request includes identification information indicating a primary geographic region associated with a requestor of the store data request;
analyzing the store data request to determine an originating geographic region for the store data request, the originating geographic region serviced by a first plurality of storage units;
determining that the originating geographic region differs from the primary geographic region;
in response to determining that the originating geographic region differs from the primary geographic region, identifying, by the one or more processing modules, a second plurality of storage units servicing the primary geographic region, the second plurality of storage units differing from the first plurality of storage units; and
facilitating, by the one or more processing modules, dispersed storage of at least a portion of the data object in the second plurality of storage units.

10. The method of claim 9 further comprises:
selecting an authentication authority for authentication of the requestor of the store data request;
providing at least a portion of the identification information to the authentication authority; and
receiving responsive information from the authentication authority indicating that the store data request is allowed by the DSN.

11. The method of claim 10, wherein the identification information includes at least one of:
user profile information;
location coordinates;
country identification information;
continent identification information;
address information; or
a ZIP code.

12. The method of claim 10, wherein the authentication authority includes at least one of Active Directory® Domain Services, a Lightweight Directory Access Protocol server, or a KeyStone identity service.

13. The method of claim 9, wherein the first plurality of storage units is in closer geographic proximity to the originating geographic region than the primary geographic region.

14. The method of claim 9, wherein facilitating dispersed storage of at least a portion of the data object in the second plurality of storage units includes:
dispersed storage error encoding the data object to produce a plurality of sets of encoded data slices, wherein the data object is segmented into a plurality of data segments and wherein each data segment is dispersed storage error encoded into a respective set of encoded data slices;
identifying one or more storage units of the second plurality of storage units; and initiating storage of the plurality of sets of encoded data slices in the one or more identified storage units.

15. The method of claim 9 further comprises:
facilitating, by the one or more processing modules, replicated storage of at least a portion of the data object in the first plurality of storage units.

16. A computing device for use in a dispersed storage network (DSN) having storage units distributed in a plurality of geographic regions, the computing device comprises:
a network interface;
a local memory; and
a processing module operably coupled to the network interface and the local memory, wherein the processing module operates to:
receive, via the network interface, a store data request to store a data object in the storage units of the DSN, wherein the store data request includes requesting entity credentials associated with a user profile known to the DSN;
obtain metadata relating to the requesting entity credentials, the metadata indicating a primary geographic region for the user profile;
analyze the store data request to determine an originating geographic region for the store data request, the originating geographic region associated with a first plurality of storage units;
determine that the originating geographic region differs from the primary geographic region;
in response to determining that the originating geographic region differs from the primary geographic region, identify a second plurality of storage units associated with the primary geographic region, the second plurality of storage units differing from the first plurality of storage units; and
facilitate dispersed storage of at least a portion of the data object in the second plurality of storage units.

17. The computing device of claim 16, wherein the processing module further operates to:
select an authentication authority based on the requesting entity credentials;
provide, via the network interface, at least a portion of the requesting entity credentials to the authentication authority for use in authenticating a requesting entity; and
receive, via the network interface, responsive information from the authentication authority.

18. The computing device of claim 17, wherein the authentication authority includes at least one of Active Directory® Domain Services, a Lightweight Directory Access Protocol server, or a KeyStone identity service.

19. The computing device of claim 16, wherein the first plurality of storage units is in closer geographic proximity to the originating geographic region than the primary geographic region.

20. The computing device of claim 16, wherein the processing module further operates to facilitate dispersed storage of a least a portion of the data object in the second plurality of storage units by:
dispersed storage error encoding the data object, in accordance with dispersal parameters associated with the user profile, to produce a plurality of sets of encoded data slices, wherein the data object is segmented into a plurality of data segments and wherein each data segment is dispersed storage error encoded into a respective set of encoded data slices;
identify one or more storage units of the second plurality of storage units; and
initiate, via the network interface, storage of the plurality of sets of encoded data slices in the one or more identified storage units.

* * * * *